June 9, 1931.  N. K. PANZIREFF  1,809,145

CHAIN

Filed Aug. 24, 1929

NICOLAS K. PANZIREFF

INVENTOR

BY John P. Nixonow

ATTORNEY

Patented June 9, 1931

1,809,145

UNITED STATES PATENT OFFICE

NICOLAS K. PANZIREFF, OF MOSCOW, UNION OF SOCIALIST SOVIET REPUBLICS

CHAIN

Application filed August 24, 1929, Serial No. 388,120, and in Germany July 27, 1928.

My invention relates to chains and has a particular reference to link or roller chains containing side links connected with bolts or pins with rollers.

The object of my invention is to provide a link or roller chain which can be easily assembled from individual members or taken apart again, with removal, if necessary, of one or more individual links.

Ordinary link chains are usually provided with removal bolts or pins which can be withdrawn in order to disconnect the ends of the chain, for instance, for mounting same on transmission sprockets. Sometimes all such bolts or pins are removable.

The disadvantage of such an arrangement is that the bolts or pins, taking share in the strain to which the chain is subjected, and bearing against the sprocket teeth, become easily worn out, with corresponding wear and loosening of locking devices, such as nuts, cotter pins, etc. As a result, due to the partial rotation of such pins or bolts, they may easily become disengaged and fall out, thereby releasing the ends of the chain.

In order to obviate this difficulty I provide my chain with locking bolts or pins, placed in the middle of each link, where these locking pins are not subjected to any strain or to any rotary movement. All the links in my chain are made removable with removable roller pins, but they cannot be taken apart until the locking pins are removed.

My invention is described more fully in the accompanying specification and drawings in which—

Figure 1:
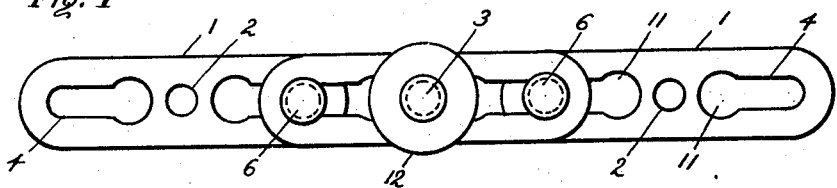
Figure 2:
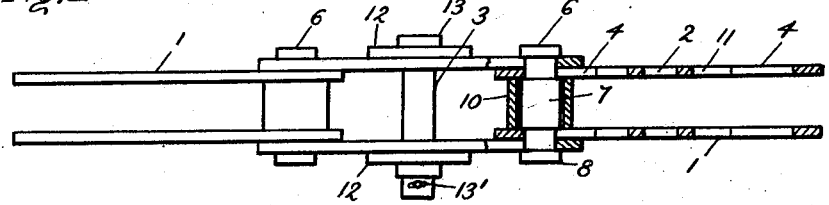
Figure 3:
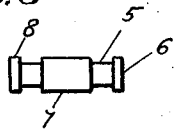
Figure 4:
Figure 5:
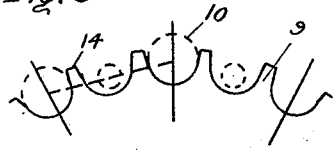

Fig. 1 is a side view of my chain, Fig. 2 is a top view of same, Fig. 3 is a view of a roller pin, Fig. 4 is a view of a locking pin, and Fig. 5 is a view showing diagrammatically the arrangement of my chain on an ordinary sprocket.

My chain consists of flat links 1 with central apertures 2 for locking bolts or pins 3. Both ends of the link are provided with elongated apertures 4, so that each link has three separate apertures. The elongated apertures provide bearing surfaces for necks or journals 5 of connecting or roller pins 6. These pins 6 have enlarged middle portions 7 and heads 8 which prevent the separation of pins from the links, when the chain is assembled and stretched on the sprockets 9 (Fig. 5). The length of the neck 5, or the distance between the corresponding shoulders formed by the heads 8 and bodies 7, is such that two links 1 can be placed between these shoulders side by side, as shown in Fig. 2. Steel rollers 10 can be placed on the pins 6 in order to reduce the friction against the teeth of the sprocket and to provide larger bearing surfaces.

The apertures 4 have enlarged openings 11 near the central apertures 2 through which the pins 6 can be inserted. These openings are fully or partly covered with locking washers 12 held by the locking pins 3 inserted in central apertures 2. These pins are retained with heads 13 at one end and cotter pins 13′ at the other. It is evident, of course, that any other suitable method of retaining the locking pins may be used, for instance, by providing them with threads and nuts etc.

My chain can be used with ordinary sprocket wheels 9, the power being transmitted through one half of the total number of teeth 14 in contact with the chain. The pin 3 fits between two adjacent teeth without touching them, thereby not being subjected to any wear.

The pin 3 lies below the center of the curve with which the space between the teeth is formed, so that the diameter of this pin must be smaller than the diameter of the rollers 10, when ordinary sprockets are used. Special sprockets can be designed, however, in order to suit any practical arrangement of relative dimensions of the locking pins 3 and rollers 10 (or connecting pins 6 is used without rollers).

In order to disconnect the chain, the locking pin 3 with the washers 12 is removed, and the two adjacent pairs of links are moved together, until one of the pins 6 comes opposite the enlarged portions 11 of the elongated holes 4. The pin 6 can then be removed through these enlarged openings, and the ends of the chain become free.

The chain is assembled in a similar manner: its ends are brought together until the enlarged portion of the end links register, and then the pin 6 is inserted through these enlarged portions. The chain can be then tightened, and the locking pin 3 with the washers 12 is placed in its operating position as shown in Figs. 1 and 2.

Important advantages of my chain are that it can be assembled in any desired length from fully finished and hardened links and pins, as the latter are not required to be riveted. It can be with equal ease taken apart. Once properly assembled and provided with locking pins, the chain cannot become loose or fall apart by itself. The locking pins do not come in a contact with sprocket wheels and, therefore, do not wear out and cannot become loosened, unscrewed or otherwise damaged.

I claim as my invention:

In a chain, the combination with links provided with elongated apertures at their ends, said apertures having enlarged portions at their inner ends, connecting pins for said links, the middle portions of said pins being of a larger diameter than the necks at their ends, said necks being adapted to fit said elongated apertures, the middle portions of said pins being adapted to pass through said enlarged portions of said elongated apertures, said links being further provided with central openings, locking pins adapted to fit into said middle openings, and washers at the ends of said pins adapted to prevent said connecting pins from reaching said enlarged portions of said apertures when said chain is fully assembled.

Signed at Berlin, in the county of Brandenburg and State of Prussia this 8th day of August A. D. 1919.

NICOLAS K. PANZIREFF.